Patented Dec. 21, 1937

2,103,153

UNITED STATES PATENT OFFICE 2,103,153

CASEIN COMPOUND AND PROCESS OF MAKING

Henry V. Dunham, Bainbridge, N. Y.

No Drawing. Application April 26, 1935, Serial No. 18,435. In Great Britain December 8, 1934

17 Claims. (Cl. 260—9)

This invention relates to the production of compounds of casein with metal hydroxides and salts, or with ammonium salts, particularly those salts which are acidic or neutral, or those metal hydroxides so feebly alkaline that they do not act as solvents for casein in the presence of water.

The present application is in part a continuation of my co-pending application 644,752 filed November 28, 1932 (now Patent 2,005,730).

In accordance with the present invention, the casein may be provided in a moist condition, containing an amount of water which is preferably substantially less than the amount of actual casein, for example containing 15 to 30% of water. This is first roughly mixed with the salt or compound of the metal. The mixture is then thoroughly kneaded together under high pressure, and is extruded in the form of a relatively thin piece or pieces. Finally the extruded material is dried and preferably pulverized or otherwise comminuted. If dry casein constitutes the starting material, it can be first mixed with a small amount of water or aqueous liquid, and allowed to stand for a time, to absorb the said liquid and then mixed with the metal compound. Or if the metal compound is soluble, it may be dissolved in water, and the casein soaked in the solution, the amount of water being as stated above. In addition to the above mentioned metal compounds or salts, a small amount of alkaline material, preferably a mild alkali such as sodium bicarbonate or borax may also be added to the initial material if desired.

In carrying out the process, the moist mixture is run through a suitable extruding machine, which contains a conveyer screw rotating within a cylindrical casing, preferably surrounded by a jacket through which heating or cooling fluids may pass, or a plurality of jackets, some of which may cool the mixture and others may heat the mixture, depending upon what special materials are being employed. Near the discharge end of the extruding device is a grid or series of grids, through which the charge is forced, in order to thoroughly knead the ingredients together, and maintain the desired amount of pressure upon the materials in the convolutions of the screw. As the mixture passes through the screw press heat may be generated by the reaction and/or heat may be supplied by the jackets referred to above. The stiff mixture is forced out at the end of the extrusion machine in the form say of a ribbon which may be a sixteenth of an inch thick more or less, or in the form of a number of small wires or worms, say a sixteenth of an inch in diameter, more or less. The pressure can be regulated by varying the size of the holes in the grid and the extrusion outlets, so as to give a pressure in the kneading compartment of two tons per square inch, more or less. The extruded material is then dried. I call attention to the fact that the amount of water in the mixture is comparatively small which is an advantage in the drying operation.

The following examples will serve to illustrate the invention.

Example 1

To 100 parts of air-dried casein, containing about 10% moisture are added 20 parts of cold water and the mixture allowed to stand for about an hour, during which time the casein absorbs the whole of the water, forming a mass having a consistency resembling wet corn meal. Then 8 parts of ferric hydroxide (containing 15% of water) are added and the mass mixed by agitation for 10 minutes. The mixture is then run through the extruding machine, with external heating. The extruded ribbon is dried in an oven, and then ground to a coarse powder. This product, which contains about 4.5% Fe is dark brown in color. It is insoluble in water but readily soluble in alkalis. It is useful for medicinal purposes.

Example 2

Another casein-iron preparation may be made in a similar manner by mixing 5 parts of casein and 1 part of water, later adding 1 part of iron lactate, kneading and extruding. This product is insoluble in water but soluble in alkalis. It may be ground to a fine powder, mixed with 1.5 parts of water and 0.72 part of sodium bicarbonate and again passed through the extruding machine, and dried. The final dry product, which is soluble in water, contains about 3% Fe.

Example 3

A casein-copper product can be made by mixing a solution of 12.5 parts of pure copper sulphate in 40 parts of water with about 160 parts of casein and treating the mixture in the extruding machine, drying if desired, and thereafter grinding the product, mixing with 21 parts of sodium bicarbonate in about 40 parts of water, retreating in the extruding machine and finally drying. The end product contains about 2% Cu and is soluble in water.

The "parts" throughout the examples are by weight, and the above examples are given merely by way of illustration.

In Table No. 1, below, I give the properties of a considerable number of compounds made in accordance with the present invention. In column A is shown the amount of the particular metal compound used in each case with 100 parts of casein and 20 parts of water to prepare the mixture to be charged into the extruding machine. In column F, are recorded the relative viscosities of solutions of the finished products in a given amount of ammonia diluted with sufficient water to bring the viscosity within practical range at 70° F. The amount of water added varies with the character of the different compounds, a very viscous solution such as that obtained with the aluminum borate compound requiring a greater amount of water to bring it to a thin consistency than does a thin-flowing solution obtained for instance with the ammonium acetate compound, which requires no dilution. In each case 100 parts of the dry powder were mixed with 7 parts of ammonia (26° Bé.) in 400 parts of water, heated to 160° F., cooled and diluted to the total water-content shown in column E, except that the compound made with antimony lactate required 10 parts of ammonia. The viscosity values recorded in column F were determined at a standard temperature of 70° F. on a Stoermer viscosimeter (driven by a 500 gr. weight) and it is to be understood that the lower the reading, the higher is the viscosity.

soluble in water but soluble in such casein solvents as borax, trisodium phosphate and caustic soda. The compounds of cobalt carbonate, calcium acetate, manganese citrate and strontium salicylate are also completely soluble in a 10% aqueous solution of sodium acetate while the other compounds listed and casein itself are not soluble.

Some of the compounds may be used with advantage in place of casein for making glues while others are unsuitable for this purpose. A comparative test in a typical casein glue formula was made as follows: The dry ingredients of the casein glue consist of 75 parts casein, 12 parts hydrated lime, 6 parts trisodium phosphate and 7 parts sodium fluoride. 100 parts of this dry mixture are mixed with 200 parts of water, initially at a temperature of about 60° F. and well stirred for 20 minutes. At this stage the viscosity of the liquid glue is taken on the Stoermer viscosimeter. The glue is then allowed to stand and the viscosity again determined at the end of 5 hours and again at 24 hours. The values obtained are recorded in columns G, H, and I of Table 1. In further tests 75 parts of the selected casein-compound was substituted for 75 parts of casein in the above formula and the mixture stirred in the same manner with the same proportion of water as before, and the viscosity determined at the same intervals and recorded in the respective columns in Table 1.

Table 1

| Extruded product | | | Ammonia test | | | | In glue formula—viscosity at 70° F. | | |
|---|---|---|---|---|---|---|---|---|---|
| | | | Amounts used | | | | | | |
| Metal compound, name | Amt. used | Casein, amt. used | Casein comp. | 26° Bé. ammonia | Water | Visc. 70° F. | 20 min. | 5 hrs. | 25 hrs. |
| | A | B | C | D | E | F | G | H | I |
| Bi hydroxide | 7.63 | 100 | 100 | 7 | 500 | 8 | 60 | 42 | 70 |
| Pb hydroxide | 5.11 | 100 | 100 | 7 | 800 | 75 | 32 | 10 | 20 |
| Ca carbonate | 1.15 | 100 | 100 | 7 | 500 | 5 | 34 | 15 | 1 |
| Co carbonate | 10.5 | 100 | 100 | 7 | 600 | 16 | j | | |
| Ni carbonate | 5.22 | 100 | 100 | 7 | 600 | 4 | 40 | 29 | 1 |
| Zn carbonate | 5.46 | 100 | 100 | 7 | 500 | 3 | j | | |
| Mg formate | 6.6 | 100 | 100 | 7 | 600 | 560 | 1 | jell | |
| Na formate | 3.0 | 100 | 100 | 7 | 400 | 3 | 20 | 18 | 12 |
| $NH_4$ acetate | 6.78 | 100 | 100 | 7 | 400 | 19 | 24 | 1 | jell |
| Ca acetate | 2.02 | 100 | 100 | 7 | 600 | 31 | 26 | 5 | jell |
| Pb acetate | 8.35 | 100 | 100 | 7 | 600 | i | 28 | 4 | jell |
| K acetate | 8.63 | 100 | 100 | 7 | 500 | 13 | 16 | 5 | 16 |
| Mn citrate | 10.8 | 100 | 100 | 7 | 500 | 7 | 17 | 1 | jell |
| Sb lactate | 10.1 | 100 | 100 | 10 | 400 | 27 | 31 | 4 | jell |
| Ca lactate | 3.52 | 100 | 100 | 7 | 600 | 3 | 28 | 7 | jell |
| Sr salicylate | 6.82 | 100 | 100 | 7 | 400 | i | 11 | 4 | jell |
| Al borate | 5.84 | 100 | 100 | 7 | 1000 | 15 | 18 | 2 | jell |
| $(NH_4)_2Cr_2O_7$ | 11.1 | 100 | 100 | 7 | 1000 | 15 | i | | |
| $K_2Cr_2O_7$ | 12.3 | 100 | 100 | 7 | 1000 | 24 | i | jell | |
| Cd sulfate | 9.2 | 100 | 100 | 7 | 500 | i | i | | |
| Mg sulfate | 5.3 | 100 | 100 | 7 | 500 | 5 | 15 | 2 | jell |
| Na bisulfate | 5.46 | 100 | 100 | 7 | 600 | 42 | 14 | 1 | jell |
| Ba chloride | 2.38 | 100 | 100 | 7 | 700 | 452 | 18 | 1 | jell |
| Ca chloride | 1.28 | 100 | 100 | 7 | 600 | 110 | 22 | 2 | jell |
| Cd chloride | 7.9 | 100 | 100 | 7 | 500 | i | i | | |
| Co chloride | 4.85 | 100 | 100 | 7 | 600 | 14 | j | | |
| Li chloride | 3.70 | 100 | 100 | 7 | 400 | 3 | 19 | 2 | 3 |
| Hg(ous) chloride | 5.2 | 100 | 100 | 7 | 600 | 8 | 19 | 96 | 360 |
| Ni chloride | 5.71 | 100 | 100 | 7 | 700 | 13 | 34 | 1 | jell |
| Sn (ous) chloride | 8.19 | 100 | 100 | 7 | 400 | 2 | 58 | 44 | 350 |
| Unextruded casein | | 100 | | 7 | 500 | 20 | 40 | 10 | jell | i=insoluble in this formula. j=slightly soluble but jells almost immediately.

The "metal compounds" given in the above list are not substances which, in the presence of water, act as solubilizing agents for casein.

As indicated in Table 1, nearly all the casein compounds listed are soluble in ammonia, while a few are insoluble even when an excess of ammonia is employed. All the compounds are in- It will be noted (see last line of table) that the glue prepared from casein in its natural condition gave viscosity values of 40 at 20 minutes, 10 at 5 hours and was a firm jell at 24 hours. Some of the casein compounds (indicated by the letter i in column G) did not dissolve in this formula, while others (indicated by the letter j)

dissolved to some extent forming a stiff mass which did not liquefy sufficiently for a viscosity determination to be made, showing that they are unsuitable for use in this formula but not necessarily unfit for use in other glue formulas. It may be noted that the glue made from the casein compound of calcium carbonate, which in the early stages has substantially the same consistency as that prepared from casein, remains fluid overnight which is an important advantage for some purposes, while the glue made from the casein compound of nickel carbonate maintains a more uniform consistency over the first few hours and also remains fluid and usable overnight, whereas the casein glue in the same period of time has passed into an unusable condition. The compound with cadmium chloride is insoluble in ammonia and insoluble in the glue formula but it is soluble in sodium carbonate solution.

It is to be understood that the results recorded in the above table are not the same as would be obtained by substituting for the extruded casein-compound an equal weight of a simple mixture of its components (i. e. casein and the respective salt) which has not been subjected to the process of kneading and extrusion described above. This is clearly shown in Table 2 in which the viscosities of ammoniacal solutions of several of the casein-compounds are compared with those obtained by similarly dissolving a proportionate mixture of the unextruded components. The compositions of the respective casein-compounds are the same as in Table 1 but they are stated here on a percentage basis for convenience. The parts are by weight. The amount of salt used is recorded in the second column and the amount of casein used in the third column, these together making 100. One hundred parts of the mixture are dissolved directly in the amount of water shown in the sixth column with 7 parts of 26° Bé. ammonia added, heated to 160° F. with stirring and cooled to 70° F. The Stoermer viscosity of the solution at 70° F. is shown in the last column. A like test was made with 100 parts of the corresponding casein-compound dissolved in the same way. In this table the letter M denotes the unextruded mixture and E the corresponding extruded material. In every pair of tests a wide difference of viscosity is observed, and I believe that this indicates that a chemical reaction takes place during the passage of the material through the extrusion press, promoted by the kneading action, elevated pressure and temperature and perhaps other causes. The properties of the casein compounds thereby produced are markedly different from those of a simple, mechanical mixture of the same ingredients. In some cases the products are of different color, e. g. in the case of cobalt carbonate the M mixture is of a light brown color while the extruded product E is brick red.

*Table 2*

| Compound used | Amt. of compound used | Amt. of casein used | Amt. of casein compound used | Treatment | Amt. of water used | Amt. 26° ammonia used | Viscosity of solution at 70° F. |
|---|---|---|---|---|---|---|---|
| Bi hydroxide | 7.09 | 92.91 |  | M | 500 | 7 | 33 |
| Do |  |  | 100 | E | 500 | 7 | 38 |
| Co carbonate | 9.48 | 90.52 |  | M | 600 | 7 | 400 |
| Do |  |  | 100 | E | 600 | 7 | 20 |
| Zn carbonate | 5.18 | 94.82 |  | M | 400 | 7 | 35 |
| Do |  |  | 100 | E | 400 | 7 | 4 |
| Mn citrate | 9.74 | 90.26 |  | M | 400 | 7 | 60 |
| Do |  |  | 100 | E | 400 | 7 | 8 |
| K dichromate | 10.95 | 89.05 |  | M | 800 | 7 | 500 |
| Do |  |  | 100 | E | 800 | 7 | 60 |
| Na bisulphate | 5.18 | 94.82 |  | M | 600 | 7 | 180 |
| Do |  |  | 100 | E | 600 | 7 | 41 |
| Ca chloride | 1.26 | 98.74 |  | M | 600 | 7 | 110 |
| Do |  |  | 100 | E | 600 | 7 | 21 |

The differences between the viscosities of the ammoniacal solutions of the compounds in Table 2 and those of the corresponding solutions containing the same proportion of dry compounds and water in Table 1 are due to the different method used in making the solutions. It has been stated that in Table 1 the solutions were made by first mixing 1 part of dry substance with 4 parts of water, heating and subsequently diluting with water to the required amount, while in Table 2 the full amount of water was added initially. With some of the substances it made a difference whether the water was added in several steps or all in one step.

On account of the widely different chemical and physical properties of the compounds listed in Table 1 they are adapted for a wide variety of purposes. The compound of aluminum borate, for instance, when dissolved in presence of ammonia with as much as 10 parts of water has a thicker consistency or body than the corresponding casein solution with only 5 parts of water, and on account of this property of forming heavy-bodied solutions it can be used with advantage in paper-coating, since the liquid coating will lie on the surface of the paper instead of sinking deeply into the fibre. Combinations of casein with salts of lead, mercury, arsenic, copper and the like are useful in the making of insecticides. They provide a very satisfactory means of applying to vegetation, as a spray, solution of poisonous products which adhere to the foliage and produce the desired effects; or in a finely pulverized form they can be applied as a dust with or without the addition of a small proportion of alkali so that when the foliage is slightly moist or becomes damp with dew the powdered compound will adhere to the foliage sufficiently to be practical for a dust insecticide.

I believe that some of the compounds will have particular value as fertilizers or plant foods. It is known, for example, that certain types of vegetation require a small amount of manganese, and the availability of such material in the soil is of great importance. In the casein-manganese combinations the manganese is present in an especially available form.

The combinations of casein with dichromates made by this process, which are soluble in ammonia, when applied to paper and dried form an insoluble coating without the addition of any other substance. It may be noted in Table 2 that there is a wide difference in the physical consistency of the ammoniacal solution of the extruded product and a mixture of casein with potassium dichromate similarly dissolved with 8 parts of water, the viscosity of the former being 60 and that of the latter 500 which represents a thin watery solution of less commercial value. With a lesser proportion of water the casein-dichromate compound has a heavy, almost jelly-like consistency.

The above mentioned casein combinations with lead hydroxide and bismuth hydroxide provide glues in the glue-formula above described which remain fluid over a much longer period than those prepared directly from the casein.

I believe that some of the casein compounds produced by this process e. g. those of bismuth and iron have therapeutic value.

The casein used in these tests was a commercial grade made by precipitation with hydrochloric acid, which type I have found to be more suitable in the present process than the rennet casein usually employed in the art of plastics but I may also use casein precipitated by other acids.

For making the tests of viscosity in ammoniacal solution the extruded and dried product was ground to pass through a standard 24 mesh wire screen. The materials used in the glue formula tests were ground to pass a 50 mesh wire screen in order to facilitate dissolving in the glue-mixing operation which is conducted at ordinary room temperature.

It may in some cases be possible to omit the drying and comminuting step, e. g. where the extruded material (say ribbon) is run directly into an alkaline solution to dissolve the casein content and/or other alkali-soluble constituents present.

Instead of drying the ribbon and then comminuting the dry product, it may be feasible in some cases, to comminute the ribbon, and to then dry the comminuted material, followed, if desired, by further grinding.

The final product will be ordinarily dissolved in an alkaline solution before use. But in some cases alkali is added before the final extrusion step, and the product can then be dissolved in water.

The term "not strongly alkaline" as used in the appended claims is intended to include not only salts and compounds which in aqueous solution or suspension, are neutral or acid to indicators like litmus, but also substances such as lead hydroxide which when suspended in water may give a very slightly alkaline reaction, to litmus, but are not sufficiently alkaline to act as solvents for casein.

I claim:

1. As a product, a homogeneous combination of acid-precipitated casein with a compound selected from the group consisting of metal salts, metal hydroxides and ammonium salts, said compound being not sufficiently alkaline in reaction to constitute a solubilizing agent for casein, and which compound is capable of reacting with moist casein, said product being extruded under heavy pressure while containing less water than casein.

2. As a product, a homogeneous combination of acid-precipitated casein with a compound selected from the group consisting of metal salts, metal hydroxides and ammonium salts, said compound being not sufficiently alkaline in reaction to constitute a solubilizing agent for casein, and which compound is capable of reacting with moist casein, said product being extruded under heavy pressure while containing less water than casein, such product being insoluble in water but soluble in alkaline solutions.

3. As a product, a homogeneous combination of acid-precipitated casein with a compound selected from the group consisting of metal salts, metal hydroxides and ammonium salts, said compound being not sufficiently alkaline in reaction to constitute a solubilizing agent for casein, together with an alkaline substance which renders the product soluble in water, and which compound is capable of reacting with moist casein, said product being extruded under heavy pressure while containing less water than casein.

4. As a product, a homogeneous combination of acid-precipitated casein with a compound selected from the group of heavy metal compounds consisting of metal salts, metal hydroxides and ammonium salts, said compound being not sufficiently alkaline in reaction to constitute a solubilizing agent for casein, and which compound is capable of reacting with moist casein, said product being extruded under heavy pressure while containing less water than casein.

5. As a product, a dried homogeneous combination of acid-precipitated casein with a compound selected from the group consisting of metal salts, metal hydroxides and ammonium salts, said compound being not sufficiently alkaline in reaction to constitute a solubilizing agent for casein, and which compound is capable of reacting with moist casein, said product being extruded under heavy pressure while containing less water than casein.

6. As a product, a compound of acid-precipitated casein with a metal salt, which, in the presence of water, does not constitute a casein solvent, such product being soluble in caustic soda solution, such product being extruded under high pressure with an amount of water which is only a minor fraction of the amount of said casein.

7. As a product, a composition of acid-precipitated casein combined with a metal salt, which, in the presence of water, does not constitute a casein solvent, such product being soluble in ammoniacal solution, such product being extruded under high pressure with an amount of water which is only a minor fraction of the amount of said casein.

8. As a product, an extruded reaction product of casein with a heavy metal compound, such product being soluble in caustic soda solution, such product being extruded under high pressure with an amount of water which is only a minor fraction of the amount of said casein.

9. As a product, an extruded reaction product of casein with a heavy metal compound, such product being soluble in ammoniacal solution, such product being extruded under high pressure with an amount of water which is only a minor fraction of the amount of said casein.

10. A process of making a casein product of the character set forth, which comprises adding to moist casein containing less water than casein, a compound which in the presence of water is not a solubilizing agent for casein and which compound is selected from the group consisting of metal salts, ammonium salts and metal hydroxides, which are not sufficiently alkaline in reaction to constitute solvents for casein, and which are capable of reacting upon casein under the conditions stated, well kneading the mixture under superatmospheric pressure and subsequently drying the kneaded mixture in the form of pieces which have at least one small dimension.

11. A process of making a casein product of the character set forth, which comprises adding to moist acid-precipitated casein containing less water than casein, a salt of a metal other than an agent which, in the presence of much water will render casein soluble, and which salt is capable of reacting upon casein, well kneading the mixture, extruding the same through a narrow opening and drying the extruded material in the form of pieces which have at least one small dimension.

12. A process of making a casein product of the character set forth, which comprises adding to moist casein containing less water than casein, a compound of a metal capable of reacting upon casein to form a water-insoluble compound, well kneading the mixture, under superatmospheric pressure, and converting the kneaded mixture into the form of pieces which have at least one small dimension.

13. A process of making a casein product of the character set forth, which comprises adding a heavy metal salt to moist acid-precipitated casein containing less water than casein, well kneading the mixture under superatmospheric pressure, and drying the kneaded mixture in the form of pieces which have at least one small dimension.

14. A process of making a casein product of the character set forth, which comprises adding a hydroxide of a heavy metal to moist casein containing less water than casein, well kneading the mixture under superatmospheric pressure and drying the kneaded mixture in the form of pieces which have at least one small dimension.

15. A process of making a casein product of the character set forth, which comprises adding to moist casein containing less water than casein, a salt selected from the class consisting of non-basic salts of metals and non-basic salts of ammonium, which salt is capable of reacting upon casein, well kneading the mixture under superatmospheric pressure and drying the kneaded mixture in the form of pieces which have at least one small dimension.

16. Process of claim 10, followed by grinding the dried product.

17. A process of making a casein product of the character set forth, which comprises adding to moist casein containing less water than casein, a chemical compound selected from the herein described class consisting of non-alkaline salts of heavy metals, hydroxides of heavy metals, salts of ammonium, calcium, strontium and magnesium which when mixed with water give liquids which are not strongly alkaline, and the salt of these metals with organic acids; salts of antimony, aluminum and cadmium; soluble chromates and dichromates; acid sodium salts of mineral acids, lithium chloride and mixtures of the above, capable of reacting upon casein under the conditions stated, well kneading the mixture under superatmospheric pressure and subsequently drying the kneaded mixture in the form of pieces which have at least one small dimension.

HENRY V. DUNHAM.